United States Patent [19]
Mortia

[11] 3,882,443
[45] May 6, 1975

[54] DIFFERENTIAL PRESSURE TRANSDUCER

[75] Inventor: Saichiro Mortia, Tokyo, Japan

[73] Assignee: Hokushin Electric Works, Ltd., Tokyo, Japan

[22] Filed: June 6, 1973

[21] Appl. No.: 367,411

[30] Foreign Application Priority Data
June 30, 1972 Japan.............................. 47-77936

[52] U.S. Cl.................................. 338/42; 338/36
[51] Int. Cl........................................... H01c 13/00
[58] Field of Search ...... 338/36, 42; 73/393, 407 R, 73/398 R

[56] References Cited
UNITED STATES PATENTS

| | | | |
|---|---|---|---|
| 2,497,255 | 2/1950 | Brown............................ | 73/407 R X |
| 2,590,324 | 3/1952 | Jones............................. | 73/407 R X |
| 2,956,252 | 10/1960 | Boode et al........................... | 338/42 |
| 3,140,613 | 7/1964 | Hasegawe........................ | 73/393 X |
| 3,534,612 | 10/1970 | Buckland..................... | 73/407 R X |

Primary Examiner—C. L. Albritton

[57] ABSTRACT

A differential-pressure transducer whose main body is formed with opposing end faces and a passage extending between these end faces, the passage being filled with a non-compressible liquid. Mounted adjacent each end face is a pressure-sensing diaphragm, the two diaphragms being interconnected by a rod extending through the passage and terminating at each end in a disc. The diaphrams are secured to the peripheries of the discs, the rod being axially displaced in accordance with a differential pressure applied to the diaphragms. Disposed adjacent the end faces of the discs or the end faces of the main body is at least one temperature-compensating diaphragm which serves to absorb the expansion and contraction of the liquid in the passage caused by changes in ambient temperature.

8 Claims, 4 Drawing Figures

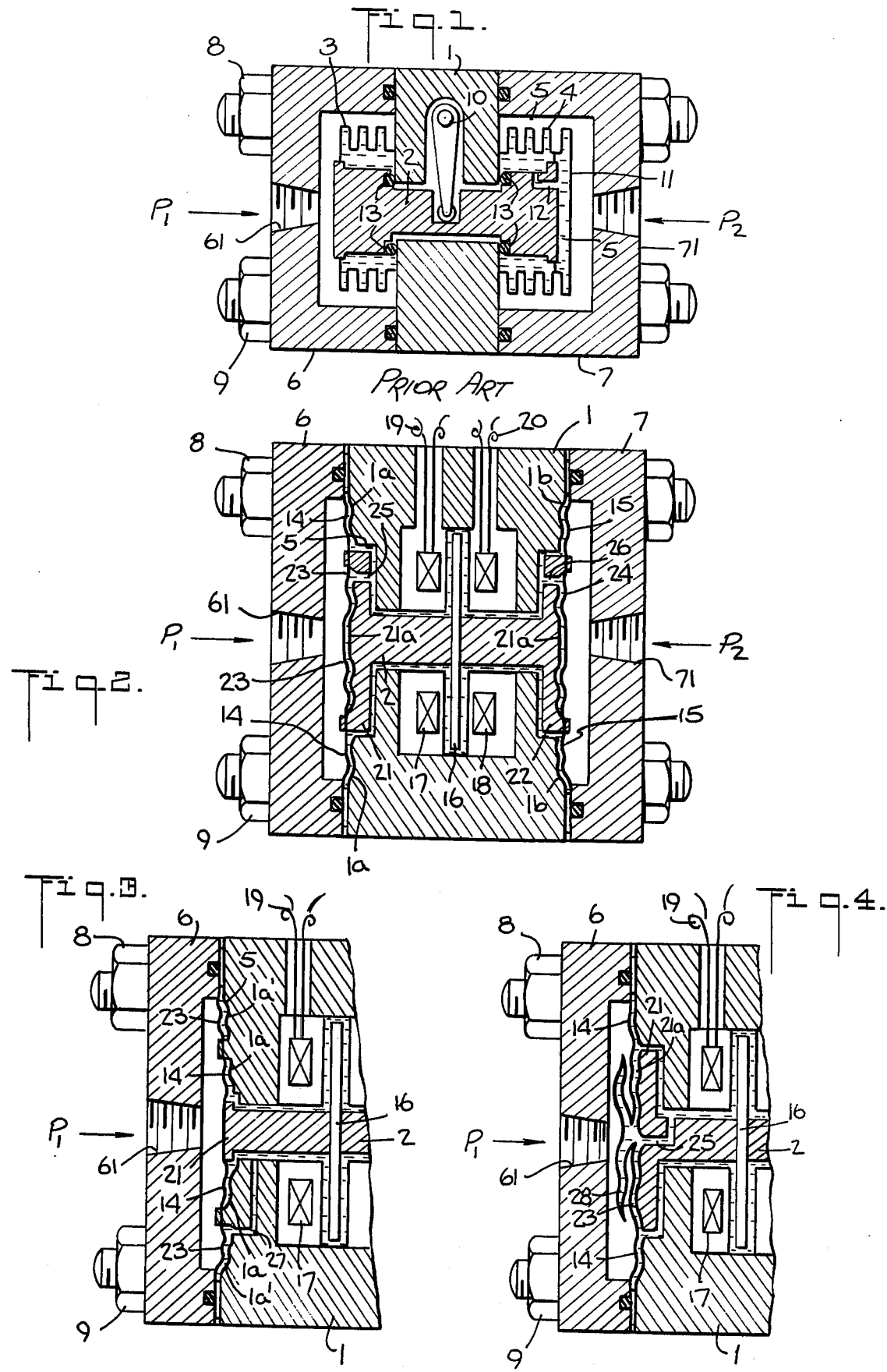

DIFFERENTIAL PRESSURE TRANSDUCER

BACKGROUND OF THE INVENTION

This invention relates generally to differential-pressure transducers, and more particularly to temperature-compensating means for a differential-pressure transducer whose sensing elements are constituted by pressure-responsive diaphragms.

Differential-pressure transducers for measuring pressure are known in which the transducer is provided with a pair of opposed pressure-responsive elements connected to each other by a rod, the interior chamber defined by the elements being filled with a non-compressible liquid. These transducers generally have an area difference ($\Delta A$) between the effective areas of the two pressure-responsive elements. It is for this reason that if the temperature of the liquid rises, the liquid pressure between the elements ($\Delta P$) increases because of liquid expansion. The resultant force ($\Delta A \cdot \Delta P$) gives rise to a measuring error in the transducer. Consequently, the transducer must be equipped with means acting to absorb the expanding or contracting liquid to prevent a reduction in transducer accuracy because of environmental temperature fluctuations.

In a conventional transducer provided with bellows as the pressure-responsive elements, it is known to include a temperature-compensating bellows placed over one of the pressure-responsive bellows, the temperature-compensating bellows serving to absorb the expanding liquid produced by an increase in temperature.

But in practice, the expanding and contracting temperature-compensating bellows may break-down as a result of an operator error, because of excessive pressure introduced in the differential-pressure transducer at the time of plant start-up. It becomes necessary, therefore, in the conventional bellows-type differential-pressure meter to provide an over-pressure check valve.

Also when the temperature-compensating means of the transducer is inadequate or absent, it is the practice to provide electrical or mechanical temperature compensation means in the converter or in the amplifier associated with the transducer output.

SUMMARY OF THE INVENTION

In view of the foregoing, it is an object of the invention to provide an improved differential-pressure measuring transducer wherein diaphragms, rather than bellows, are employed both as pressure-sensing and as temperature-compensating elements.

A significant advantage of the diaphragm arrangement is that it makes possible a simplified construction of the temperature-compensating means. Also the necessary quantity of filling liquid to be used can be minimized.

Another object of the invention is to provide a diaphragm-type of temperature-compensated transducer which may be subjected to excessive pressure without damaging the diaphragms.

Briefly stated, these objects are accomplished in a differential pressure transducer whose main body is formed with opposing end faces and a passage extending therebetween, the passage being filled with a non-compressible liquid. Mounted adjacent each end face is a pressure-sensing diaphragm, the two diaphragms being interconnected by a rod extending through the passage and terminating at each end in discs.

The diaphragms are secured to the peripheries of the discs whereby the rod is axially displaced in accordance with a differential pressure applied to the diaphragms, means being provided to convert this axial displacement into a transducer output signal. Disposed adjacent the end faces of the discs or end faces of the main body is at least one temperature-compensating diaphragm, a duct formed in the disc or the main body serving to lead the liquid from the passage to a space between the temperature-compensating diaphragm and its associated end face whereby the diaphragm serves to absorb the expansion or contraction of the liquid in the passage as a result of ambient temperature changes.

The end face associated with the temperature-compensating diaphragm is contoured to conform to the wave formation of the diaphragm whereby the end face is adapted to accommodate the diaphragm when it is pressed thereagainst, thereby avoiding damage to the diaphragm.

OUTLINE OF THE DRAWINGS

For a better understanding of the invention as well as other objects and features thereof, reference is made to the following detailed description to be read in conjunction with the accompanying drawings, wherein:

FIG. 1 is a sectional view of a conventional differential pressure transducer;

FIG. 2 is a sectional view of a first preferred embodiment of a transducer in accordance with the invention;

FIG. 3 is a fragmentary sectional view of a second preferred embodiment of a transducer; and FIG. 4 is a fragmentary sectional view of a third preferred embodiment of a transducer.

DESCRIPTION OF THE INVENTION

Referring now to the drawing and more particularly to FIG. 1, there is shown a conventional differential pressure transducer which makes use of bellows as both the pressure-sensing and the temperature-compensating elements. In this structure, the pressure-responsive bellows 3 and 4 are secured to the main body in opposing relation, the bellows responding to fluidic pressure values P1 and P2 fed into the pressure chambers. Bellows 3 and 4 are interconnected by means of a rod 2.

The interior chamber defined by bellows 3 and 4 is filled with a non-compressible liquid 5. Bellows 3 and 4 are enclosed by covers 6 and 7, respectively, to define the input pressure chambers. Cover 6 is provided with an inlet port 61 to admit fluid pressure P1, and cover 7 is provided with inlet port 71 to admit fluid pressure P2. Bolts 8 and 9 serve to hold the covers onto the main body 1, the covers being provided with suitable seals to maintain the pressure chambers air-tight.

A level 10 is installed in the main body 1 to convert the axial displacement of rod 2 to a rotational movement, whereby the differential pressure values and P2 can be derived from the lever.

Mounted over pressure-sensing bellows 4 is a temperature compensating bellows 11. Bellows 11 is filled with liquid 5 through a duct 12 formed in rod 2. Bellows 11 may, therefore, be expanded or contracted regardless of the expansion or contraction of bellows 3 and 4. Hence even if liquid 5 expands as a result of a rise in ambient temperature, the increased volume of this liquid is absorbed by temperature-compensating bellows 11, whereby a pressure rise in the liquid 5 in the chamber defined by pressure-responsive bellows 3 and 4 is prevented.

But as pointed out previously, when one of the pressure-sensing bellows is subjected to excessive pressure, the temperature compensating bellows 11 may be damaged. To avoid this, it is necessary to provide an overpressure check valve 13 to prevent the transfer of liquid in a passage between main body 1 and rod 2.

Check valve 13 is provided with rubber parts to seal the liquid 5. As a consequence, the transducer must be used within the temperature limits imposed by the characteristics of the rubber. And in the case of a bellows-type transducer, a large quantity of liquid must be sealed. Hence, when the temperature-compensating bellows 11 is attached to bellows 4, the quantity of liquid becomes so great that bellows 11 is incapable of absorbing the expansion of liquid 5.

Referring now to FIG. 2, there is shown a differential pressure transducer which obviates the drawbacks of a conventional transducer structure. This transducer includes a rod 2 terminating at each end in discs 21 and 22, respectively. A pressure-responsive diaphragm 14, provided with a central opening, is peripherally sealed to the end face 1 (a) of main body 1, the rim of the central opening being sealed to the periphery of disc 21. The surface of end face 1 (a) of the main body is contoured to conform to the corrugated or wavy surface of diaphragm 14, diaphragm 14 being disposed adjacent end face 1 (a) and being spaced slightly therefrom. The narrow space between end face 1 (a) and diaphragm 14 is filled with a non-compressible liquid 5.

A second pressure-responsive diaphragm 15, provided with a central opening, is peripherally sealed to the end face 1 (b) of main body 1 and the rim of its central opening is sealed to disc 22. The surface of end face 1 (b) is contoured to conform to the corrugated surface of diaphragm 15, this diaphragm being disposed adjacent end face 1 (b) and being spaced slightly therefrom. The narrow space between end face 1 (b) and diaphragm 15 is also filled with liquid 5.

A permeability core 16 is attached to the center of rod 2 and is movable therewith. Disposed on either side of core 16 are coils 17 and 18 which are rigidly mounted in main body 1 so that an output signal is produced proportional to the axial displacement of rod 2. This signal, which reflects the change in the differential inductance of coils 17 and 18, is taken out of the transducer through leads 19 and 20. It will be appreciated that the inductance-type detector is but one of many known mechanical or electrical means to convert the rod displacement into an output signal.

Sealed along its periphery to end face 21 (a) of disc 21 is a temperature-compensating diaphragm 23, the surface of end face 21 (a) being contoured to confrom to the corrugated surface of diaphragm 23. Diaphragm 23 is disposed adjacent end face 21 and is spaced slightly therefrom except along its periphery. The space between diaphragms 23 and end face 21 (a) is filled with liquid 5 which flows into this space through a duct 25 formed in disc 21.

Another temperature-compensating diaphragm is sealed to end face 22 (a) of disc 22 along its periphery, end face 22 (a) being contoured to conform to the corrugated surface of diaphragm 24 which is disposed adjacent end face 22 and spaced slightly therefrom, except along its periphery. The space between diaphragm 24 and end face 22 (a) is also filled with liquid 5 which flows therein through a duct 26 formed in disc 22.

Temperature-compensating diaphragms 23 and 24 are expanded or contracted by the expansion and contraction of liquid 5, without regard to pressure-responsive diaphragms 14 and 15, and thereby prevent an increase in pressure of liquid 5 between diaphragms 14 and 15 in a manner similar to the action of temperature-compensating bellows 11 in FIG. 1.

However, the quantity of liquid 5 in the temperature-compensating diaphragm type transducer can be made smaller than in a conventional bellows type since the respective clearances between diaphragms 14 and 15 and end faces 1 (a) and 1 (b) and between diaphragms 23 and 24 and end faces 21 (a) and 22 (a) can be made very small. As a result, fluctuations in liquid pressure caused by ambient temperature fluctuations can be easily absorbed by a small temperature-compensating diaphragm.

Moreover, it is a distinctive feature of this embodiment that end faces 21 (a) and 22 (a) of discs 21 and 22 are contoured to conform to the wave shape of the surfaces of pressure-responsive diaphragms 14 and 15 and temperature-compensating diaphragms 23 and 24, respectively. If, therefore, an excessive differential pressure is applied, diaphragms 14 and 23 or 15 and 24 will be pressed against end faces 1 (a) and 21 (a) or 1 (b) and 22 (a), respectively, and because of the matching wave forms, the excessive pressure will be accommodated by these end faces and damage to the diaphragms will be prevented.

The embodiment disclosed in FIG. 3 is suitable for measuring differential-pressure in ranges which are higher than those possible with the structure shown in FIG. 2. This second embodiment differs from the first embodiment in that the annular temperature-compensating diaphragms are located outside of the pressure-sensing diaphragms, rather than within these diaphragms.

Thus in FIG. 3, pressure-responsive diaphragm 14 is sealed at its periphery to the annular edge located between the periphery and the central opening of end face 1 (a) of the main body, the rim of the central opening of diaphragm 14 being sealed to the periphery of disc 21. Compensating diaphragm 23 in this instance, is disposed adjacent end face 1 (a') which surrounds end face 1 (a). The space between temperature-compensating diaphragm 23 and end face 1 (a') is filled with liquid 5 which flows therein through duct 27 formed in main body 1. FIG. 3 shows only the side of the transducer which includes pressure-sensing diaphragm 14. The opposing side of the transducer which is symmetrical with the side shown, is omitted.

The third embodiment of the transducer illustrated in FIG. 4 is a modification of that shown in FIG. 2, in that a capsule 28 is mounted over temperature-compensating diaphragm 23.

Generally, to obtain non-corrosive or mechanically strong pressure transducers, the diaphragms must be made relatively thick. But in that case, temperature-compensation cannot be carried out effectively if the diaphragms therefor are too thick. But even if the diaphragm is too thick, temperature-compensation can be performed effectively by using the capsule arrangement shown in FIG. 4 in that the required spring constant can be realized by piling up the diaphragms.

Moreover, damage of diaphragms 23 and 28 is prevented when excessive pressure is applied, for diaphragms 23 and 28 are pressed against the similarly contoured end faces 21 (a) of disc 21, as in the case of the first embodiment.

It will be appreciated that many changes may be made in the transducer without departing from the essential spirit of the invention as disclosed herein. For example, the temperature-compensating diaphragms need not be installed on both sides of the main body, for temperature compensation can be performed effectively by installing a temperature-compensating diaphragm on one side only of the main body.

The advantages gained by the invention may be summarized in the following points:

I. Because diaphragms are used both as pressure-sensing and temperature-compensating elements, a smaller quantity of filling liquid may be used, as compared to the conventional bellows type of transducer.

II. Because the end faces of the main body and the end faces on the discs are contoured to conform to the wave shape of the diaphragms, excessive pressure can be borne by the main body or the disc without damage to the diaphragm, and, there is no need for a check valve, thereby making possible a simplified and less expensive transducer.

III. Because the diaphragms effect efficient temperature compensation, it is not necessary to install electrical or mechanical temperature compensation means in the converter or amplifier in the transducer output in addition to temperature-compensating diaphragms in the transducer.

What is claimed is:

1. A differential pressure transducer comprising:
   A. a main body formed with opposing end faces and a passage extending therebetween, the passage being filled with a non-compressible liquid;
   B. a pressure-sensing diaphragm mounted closely adjacent each end face of the main body to define a narrow space therebetween, said liquid also filling said space;
   C. a rod extending through the passage and terminating at either end in discs having end faces, the diaphragms being secured to the peripheries of the discs whereby the rod is axially displaced in accordance with differential-pressure applied to the diaphragms;
   D. at least one temperature-compensating diaphragm disposed closely adjacent one of said end faces to define a narrow space therebetween, liquid from the passage being led to said space whereby this diaphragm serves to absorb the expansion or contraction of the liquid in the passage as a result of ambient temperature changes; and
   E. means coupled to said rod to translate the axial displacement thereof into an electrical output signal.

2. A transducer as set forth in claim 1 wherein said translation means is constituted by a core secured to said displaceable rod and movable with respect to fixed coils.

3. A transducer as set forth in claim 1, wherein two temperature-compensating diaphragms are provided each in association with a respective pressure-sensing diaphragm.

4. A transducer as set forth in claim 1, wherein the end face associated with said temperature-compensating diaphragm is contoured to conform to the contour of the diaphragm whereby the end face accommodates the diaphragm when it is pressed thereagainst.

5. A transducer as set forth in claim 1 wherein said temperature-compensating diaphragm is disposed outside one of said pressure-sensing diaphragms.

6. A transducer as set forth in claim 1 wherein said temperature-compensating diaphragm is disposed inside one of said pressure-sensing diaphragms.

7. A transducer as set forth in claim 1, wherein said temperature-compensating diaphragm is provided with an auxiliary capsule to increase its capacity.

8. A transducer as set forth in claim 1 wherein said pressure-sensing diaphragms are enclosed by covers to define pressure chambers having inlets thereto.

* * * * *